Aug. 12, 1924.

A. M. BARRETT ET AL 1,504,415

PORTABLE ELEVATOR

Filed April 26, 1922        4 Sheets-Sheet 1

Witness
Milton Lenoir

Inventors.
Arthur M. Barrett,
Frank L. Eidmann,
By Adams & Jackson.
Attorneys

Patented Aug. 12, 1924.

1,504,415

UNITED STATES PATENT OFFICE.

ARTHUR M. BARRETT, OF WINNETKA, AND FRANK L. EIDMANN, OF CHICAGO, ILLINOIS, ASSIGNORS TO SAID ARTHUR M. BARRETT.

PORTABLE ELEVATOR.

Application filed April 26, 1922. Serial No. 556,711.

*To all whom it may concern:*

Be it known that we, ARTHUR M. BARRETT, a citizen of the United States, and a resident of Winnetka, in the county of Cook and State of Illinois, and FRANK L. EIDMANN, a citizen of the United States, and a resident of Chicago, in the county of Cook and State of Illinois, have invented certain new and useful Improvements in Portable Elevators, of which the following is a specification, reference being had to the accompanying drawings.

Our invention relates to portable elevators or tiering machines, comprising a wheeled base on which is mounted an upright elevator frame that serves to support and guide a vertically movable platform which projects laterally over one end portion of the base and is adapted to support the load which is to be elevated or lowered. This platform is connected with suitable hoisting mechanism, also mounted on the base, so that the platform can be moved vertically, and the base is provided with a steering handle or lever connected with a steering wheel or wheels at one end of the machine for moving it around and steering it. In some machines of this type the steering wheel or wheels are arranged to be vertically movable by means of the steering handle, so that they may be raised out of operative position when desired to permit one end of the base to rest directly on the floor on legs or standards provided for that purpose, thereby preventing movement of the machine while the load is being raised or lowered. In such machines the turning of the steering handle into its operative position for moving the machine from place to place operates to move the steering wheel or wheels downward relatively to the base, so as to lift the adjoining end of the base from the floor and permit it to be transported. Our present invention is shown as applied to a machine of the latter type.

The object of our invention is to provide certain improvements in the construction and operation of machines of the general class referred to, the nature of which will appear from the following description thereof in connection with the accompanying drawings, in which.

Figure 1:
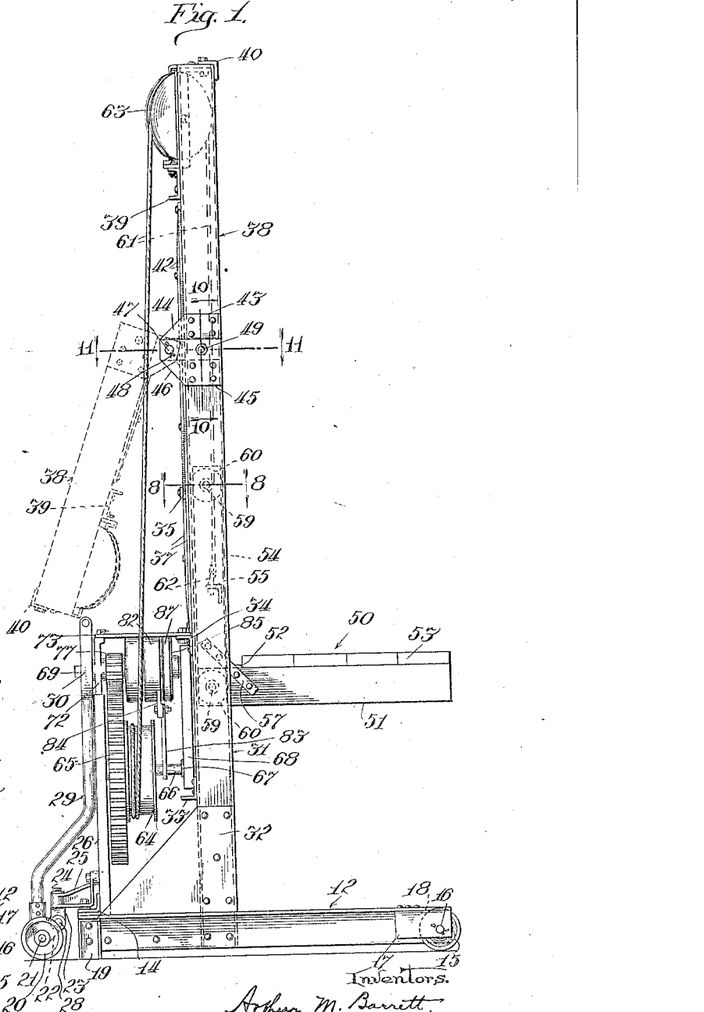
Fig. 1 is a side elevation of our improved portable elevator.
Figure 2:
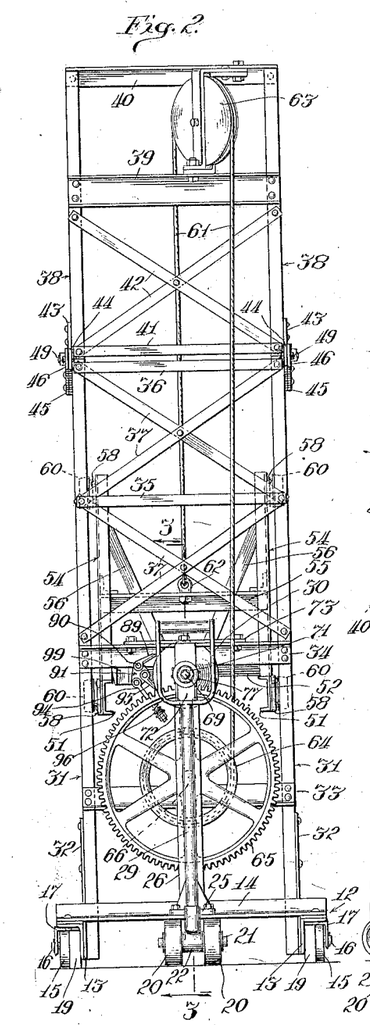
Fig. 2 is a front elevation.
Figures 3, 4, 5:
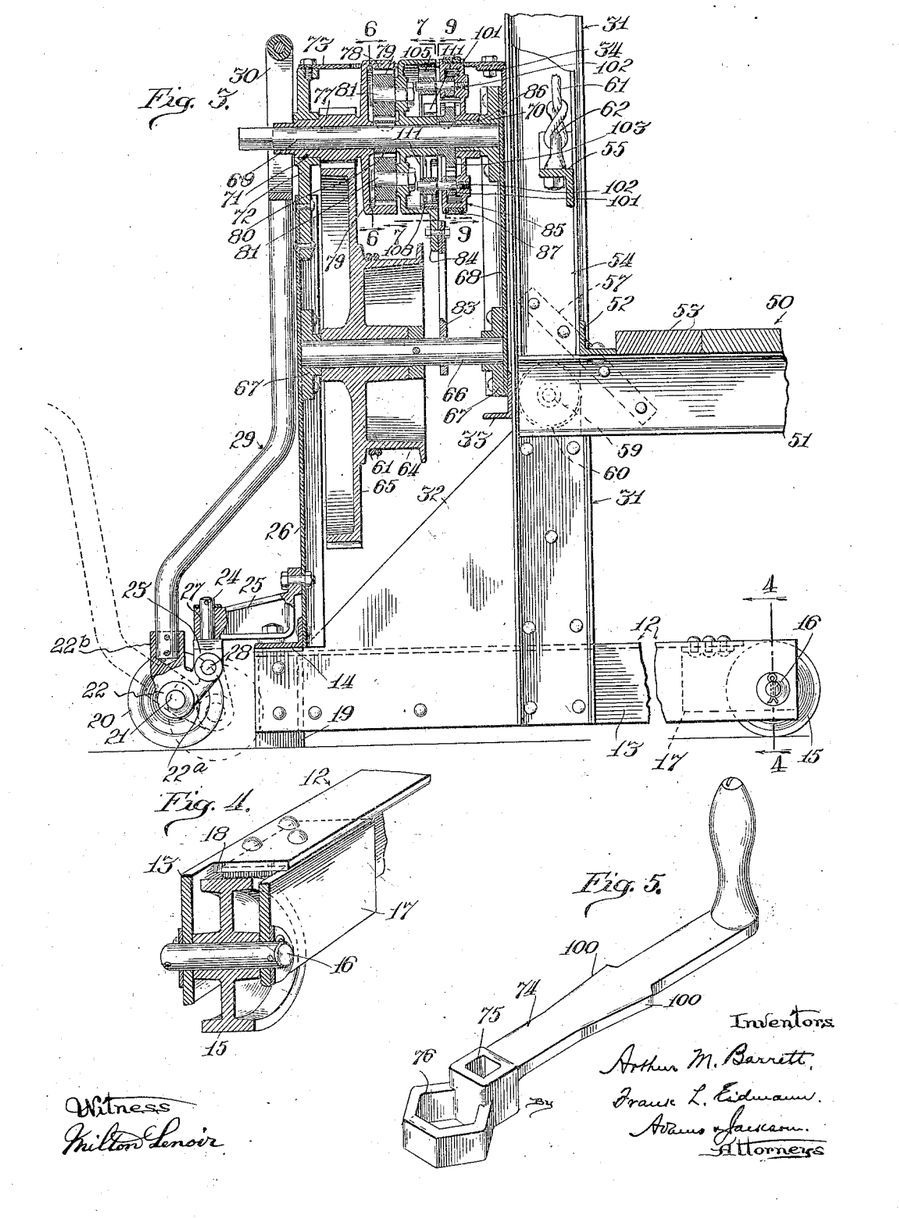
Fig. 3 is a partial vertical section on line 3—3 of Fig. 2.
Fig. 4 is a vertical section on line 4—4 of Fig. 3.
Fig. 5 is a perspective view of the crank by which the hoisting mechanism is operated and controlled.

Referring to the drawings,—12 indicates the base, which is preferably composed of angle iron side bars 13 cross-connected at one end by a cross bar, preferably in the form of an angle bar 14, as shown in Fig. 2. One end of each of the side bars 13 is provided with a wheel 15 mounted upon an axle bolt 16, one end of which is secured in the vertical flange of the side bar while its other end is secured in the vertical flange of a short angle plate 17, the horizontal web of which is firmly secured to the horizontal flange of the side bar, as best shown in Fig. 4. Above the wheel the horizontal flanges of the bar 13 and plate 17 are cut away, as shown at 18 in Fig. 4, to provide clearance for the upper portion of the wheel, thereby making it practicable to use a larger wheel. At the opposite end of the base it is provided with short depending standards 19, as shown in Figs. 1, 2 and 3, which project downward far enough to support the base in a substantially horizontal position when the steering wheels are raised out of operative position, as illustrated in Fig. 3, thus preventing movement of the base at that time.

For steering the machine we prefer to provide two steering wheels 20, set close together on an axle 21 which is mounted in the angle of an angular member 22 similar to a bell-crank lever. One of the arms $22^a$ of said member is connected by a swiveled yoke 23 having a vertical pivot pin 24 with a bracket 25 which is firmly secured to the base and also to a vertical standard 26, preferably in the form of a channel bar, as best shown in Fig. 3. The pivot 24 fits in a bearing 27 at the outer end of the bracket 25, so that the member 22 may be swung laterally to turn the steering wheels in one direction or the other. The arm $22^a$ is connected with the yoke 23 by a pivot 28, best shown in Fig. 3, so that said arm may be swung either to a pronounced angle with the yoke 23, as shown in full lines in said figure, or may be swung approximately into alinement with said yoke, as shown by dotted lines in said figure, thereby moving the steering wheels downward and, consequently, lifting the adjacent end of the base so that it will be supported on the steering wheels. The opposite arm $22^b$ of the member 22 is provided with a socket to receive the lower end of a steering lever or handle 29, which is bent intermediately so that the upper portion thereof will lie parallel with and close to the standard 26 when the steering wheels are out of operative position, as best shown in Fig. 3. At its upper end the steering lever 29 is provided with a stirrup-shaped handle 30, best shown in Figs. 2 and 3.

Figures 9, 10, 11:
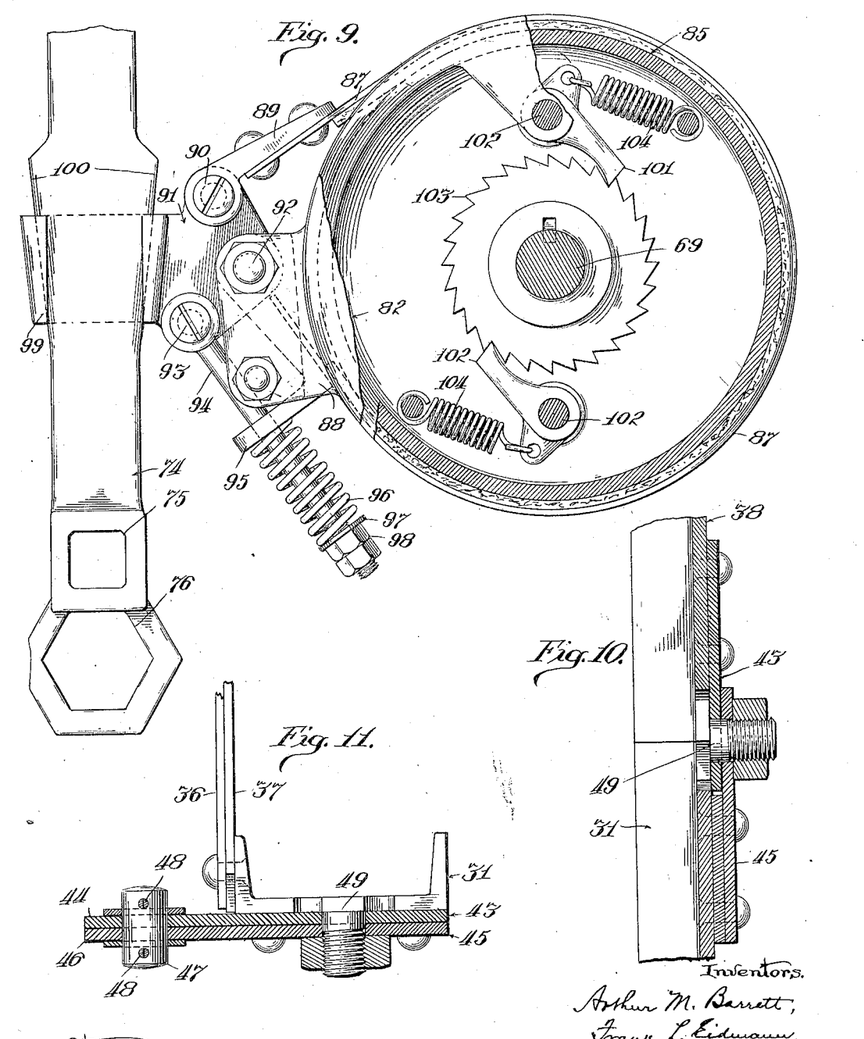
Fig. 9 is a partial vertical section on line 9—9 of Fig. 3, illustrating the brake mechanism.
Fig. 10 is a partial vertical section on line 10—10 of Fig. 1, showing one of the hinge joints by which the upper portions of the side standards are permitted to fold to avoid overhead obstructions.
Fig. 11 is a partial horizontal section on line 11—11 of Fig. 1, further illustrating the hinge construction.

Rising from the side bars 13, a little to one side of the longitudinal center of the base, is an elevator frame comprising two side standards 31, preferably in the form of channel bars, the lower portions of which are braced by plates 32 secured to said standards and to the side bars of the base, as shown in Figs. 1, 2 and 3. These side standards are also cross-connected at suitable points by angle bars 33, 34 and by bracing straps 35, 36. Diagonal braces 37 are also preferably provided wherever necessary to make the structure strong and rigid. These standards serve as guides for the lifting platform, as will be hereinafter explained. To the upper ends of the side standards 31 is hinged a folding elevator frame comprising extension standards 38 of like construction which are cross-connected by bars 39, 40 and straps 41, 42, as shown in Fig. 2. The folding elevator frame is hinged to the side standards 31, as best shown in Figs. 1, 10 and 11, from which it will be seen that when the upper and lower standards are in alinement the lower margins of the upper standards rest upon the upper margins of the lower standards, so that the inner surfaces of said standards provide a smooth, continuous path for the platform connections. As shown in Fig. 10, each of the upper standards is provided at its lower end with a side plate 43 which extends down below its lower margin so as to overlap the upper portion of the lower side standard to which it is connected, and also projects laterally, as shown at 44 in Fig. 1. In like manner each of the lower standards is provided with a side plate 45 which overlaps the lower end of the upper standard and its side plate 43 and projects laterally as shown at 46 in Fig. 1. Through the overlapping side projections 44, 46 of the plates 43, 45 is passed a pintle 47, which is secured in place preferably by cotter pins 48 shown in Fig. 11, so that an offset hinge joint is provided which permits the frame formed by the standard extensions 38 to be swung over and downward, as indicated by dotted lines in Fig. 1, thereby enabling the machine to be used in places where the height of the ceiling or other overhead obstructions would otherwise interfere with its use. When the extension frame is turned to its upright position, bolts 49 are passed through the overlapping portions of the plates 43, 45 at both sides of the structure, as shown in Figs. 1, 10 and 11, thereby firmly locking the two sections together and in alinement with each other.

Figures 6, 7, 8:
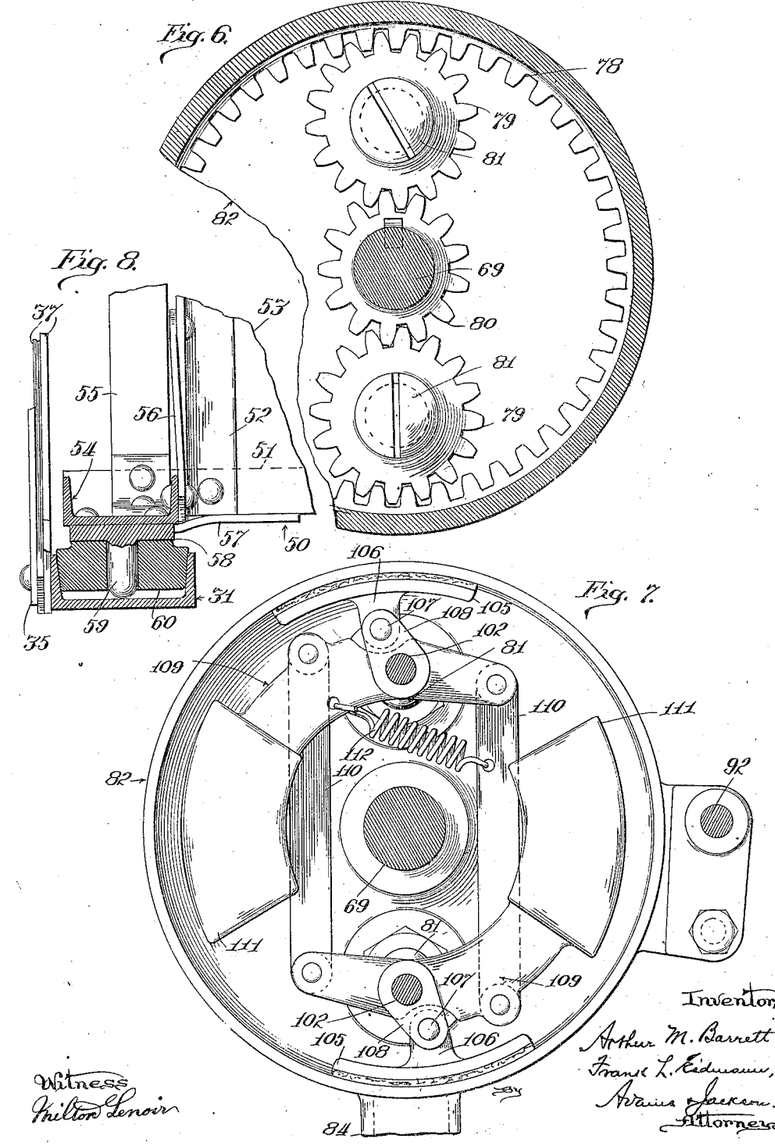
Fig. 6 is a partial vertical section on line 6—6 of Fig. 3, showing the gearing which forms a part of the hoisting mechanism.
Fig. 7 is a partial vertical section on line 7—7 of Fig. 3, showing the governor mechanism which controls the descent of the platform.
Fig. 8 is a partial horizontal section on line 8—8 of Fig. 1, illustrating the construction used for guiding the platform.

50 indicates the lifting platform which, as shown in Figs. 1, 2 and 3, comprises horizontally disposed channel bars 51, the inner end portions of which are cross-connected by an angle iron 52, as shown in Fig. 3, and on the channel bars 51 is secured a deck 53 which may either be flat, as shown in the drawings, or may have some special shape where the elevator is designed for some particular use such as handling barrels. At their inner ends the side bars 51 are connected to a frame comprising vertical bars 54, which are also preferably channel bars, and are firmly secured together and braced by a cross-bar 55 and braces 56. The upright bars 54 are also braced with the bars 51 by straps 57 shown in Figs. 1 and 3. Secured to the outer faces of the upright bars 54, preferably near the ends thereof, are plates 58 carrying pivot pins 59, on which are mounted rollers 60 adapted to run between the side flanges of the side standards 31, 38, as best shown in Fig. 8. Thus the platform is guided and held firmly by the side standards, and is capable of moving freely up or down between them. As shown in Figs. 2 and 3, the lower end of the elevator frame extends down to the lower margins of the side bars 13 of the base, and as the width of the platform 50 is less than the space between the said side bars, the platform may be lowered between them, thus bringing its deck 53 down very low when the platform is in its lowermost position. This is an advantageous feature, because it permits of the platform being shoved under a rack or table on which the load is placed, so that the platform can take up the load in much the same way as it is done in the use of lift trucks, but even where the load is not placed on a rack preparatory to its being taken up by the portable elevator, the lowering of the platform of the elevator close to the ground facilitates the placing of the load upon it.

The platform is raised or lowered by means of a cable 61, one end of which is connected to an eyebolt 62 secured to the cross-bar 55, as shown in Fig. 2. This cable passes over a sheave 63 mounted at the upper end of the folding elevator frame, as shown in Figs. 1 and 2. The other end of the cable 61 is arranged to be wound upon a drum 64, which rotates with a large gear 65 mounted on a shaft 66 the ends of which are supported by blocks 67, one of which is shown as being secured to the upright bar 26 and the other to an upright bar 68 firmly attached to the elevator frame in any suitable way. The drum 64 is preferably integral with the gear 65, as shown in Fig. 3, but this is not essential. For rotating the gear 65 and drum 64 to hoist the platform 50 with its load, we have provided variable speed mechanism, the construction and arrangement of which are best shown in Figs. 3 and 6. This mechanism comprises a shaft 69, the inner end of which is mounted in a suitable bearing in a block 70 secured to the upper end portion of the upright bar 68, as shown in Fig. 3. The other end of said shaft extends through a sleeve 71, which is journaled in a suitable bearing in an upright bar 72 secured to the upper end of the bar 26, and braced by a cross brace 73 which is connected with the upper end of the bar 68 by means of the plate 34. The outer end of the shaft 69 is squared or otherwise suitably shaped to receive a crank, and the outer end of the sleeve 71 is also made non-circular for the same purpose. As shown in Fig. 3, the outer end of the sleeve 71 is larger than the outer end of the shaft 69, and preferably they are differently shaped so that a special crank is required for use in rotating them. For example, as shown in Fig. 5, we prefer to employ a crank 74, having a squared socket 75 which fits on the outer end of the shaft 69, and an offset hexagonal socket 76 which fits upon the outer end of the sleeve 71. Thus the same crank may be used for rotating either the shaft or the sleeve. The purpose of offsetting the socket 76 is to permit the crank to be used to rotate the sleeve 71 while the steering handle is in the upright position shown in Fig. 3. In that condition the shaft 65 projects through the stirrup portion of the steering handle and the end of the sleeve is exposed through it, so that the crank may be applied to either the shaft or the sleeve without interference from the steering handle. Attached to and preferably formed integral with the sleeve 71 is a pinion 77 which meshes with the gear 65, so that by rotating said sleeve the gear 65 and drum 64 will be rotated. Attached to and preferably formed integral with the pinion 77 is an internal gear 78, with which mesh pinions 79 arranged diametrically at opposite sides of the shaft 69 and meshing with a pinion 80, mounted on and keyed to the shaft 69, as best shown in Figs. 3 and 6. The pinions 79 are mounted on studs 81 carried by a stationary drum 82, mounted concentrically with the shaft 69, as shown in Fig. 3, and held against rotation in any suitable way, as by a bar 83 secured to a flange 84 on said drum and slipped on the shaft 66. It will be apparent that by this construction if the crank be applied directly to the sleeve 71, said sleeve may be rotated with respect to the shaft 69, and it will operate to directly drive the gear 65 and drum 64. If, however, the crank be applied to the shaft 69, the sleeve 71 will then be rotated by the indirect connection provided by the pinion 80, the pinions 79 and the internal gear 78. In this case, therefore, the drum would be rotated at a slower speed with a corresponding increase of power. Thus we provide a construction by which, where a light load is to be hoisted, it may be raised quickly by means of the direct drive, and where the load is sufficiently heavy to require more than an ordinary amount of power to lift it, it may still be easily raised, although at slower speed, through the speed reducing gearing. Obviously the shaft and sleeve are turned in opposite directions to lift the load.

In order to hold the load at any point against descent while it is being hoisted, a brake drum 85 is provided, which is mounted concentrically with the shaft 69 upon a sleeve 86 which projects inwardly from the block 70, as shown in Fig. 3, and upon the periphery of this brake drum is mounted a strap brake 87, one end of which is connected with a fixed bracket 88, preferably secured to the drum 82, while the other end of said strap is secured to an arm 89 connected by a pivot 90 with one angle of a triangular lever 91 which is fulcrumed on a pivot 92 mounted in the bracket 88. The third arm of said lever has attached to it by a pivot 93 a bolt 94 which passes through a hole in a bracket 95 secured to the bracket 88 or some other fixed point. The outer end of the bolt 94 carries a spring 96, one end of which bears against the bracket 95, its other end bearing against a washer 97 held in place by a nut 98 screwed on said bolt. The purpose of the spring 96 is to hold the brake strap 87 in operative engagement with the brake drum, but, obviously, by rocking the lever 91 in a clockwise direction as viewed in Fig. 9 the brake strap may be released. For convenience in operating the lever 91 to release the brake, it is provided with an operating arm in the form of an internally tapered sleeve 99, which is adapted to receive the intermediate portion of the crank 74, which is tapered to fit said sleeve, as shown at 100 in Fig. 5. Thus a single crank serves not only to rotate the hoisting mechanism at either of two speeds, but also as a means of releasing the brake. This arrangement is advantageous also, because it makes it necessary for the operator to remove the crank from the hoisting mechanism before he can release the brake, or vice versa. Consequently, he cannot release the brake while he is hoisting, or he cannot hoist while the brake is out of its operative position, and, therefore, danger through the accidental or unexpected dropping of the load is avoided. The arm 99 may also be used as a rack for holding the crank when it is not in use. The braking devices operate to sustain the load at all times, except when the brake is released, through the instrumentality of pawls 101 mounted at diametrically opposite points on shafts 102 carried by the brake drum 85, as shown in Fig. 3. These pawls engage the teeth of a ratchet wheel 103, which is mounted on and keyed to the shaft 69, as shown in Fig. 9. Springs 104 serve to hold the pawls 101 in operative engagement with said ratchet wheel. The teeth of the ratchet wheel and these pawls are so arranged that when the shaft 69 is rotated in the proper direction to raise the load the pawls will ride idly over the teeth of said ratchet wheel, which then will not rotate as it is held against rotation by the engagement of the brake strap 87 with the brake drum 85. Reverse rotation of the shaft will, however, be prevented, because the brake drum is prevented from rotating by the brake strap and the ratchet wheel will be held against reverse rotation by the pawls. The operator may, therefore, raise the load to any desired point, and it will be held there by the brake mechanism until the latter is released.

As machines of this description are used for lowering heavy loads as well as for elevating them, it is desirable that means be provided for preventing the load from descending too fast, and for this purpose we provide governor mechanism in the form of brake shoes 105, shown in Fig. 7, which are segmental in form and are adapted to operatively engage the peripheral portion of the drum 82. These brake shoes are arranged at diametrically opposite points, and are provided with inwardly projecting lugs 106, in which are fitted pivots 107 by which they are connected with angularly disposed arms 108, preferably formed integral with centrifugally operated levers 109 mounted on the shafts 102, as shown in Fig. 7. The levers 109 are fulcrumed between their ends on their shafts, as shown in said figure, and they are interconnected at opposite sides of the shaft 69 by means of parallel links 110. 111 indicates counterbalancing weights which are carried at corresponding ends of the levers 109, and 112 indicates a spring which tends normally to hold the weights 111 in their innermost position. The arrangement is such that when the parts are in the position shown in Fig. 7, the brake shoes 105 will not be in operative engagement with the drum 82, and this condition will obtain so long as the brake drum 85 is not rotated beyond a normal rate of speed. If, however, the load be allowed to descend too fast, the rapid rotation of the brake drum, with which, as has been explained, the shafts 102 and consequently the brake shoes 105 are connected, will cause the levers 109 to be actuated by centrifugal force, thereby rocking said levers in a clockwise direction as viewed in Fig. 7. This will carry the pivots 107 toward the center line of the shafts 102 and the shoes 105, thereby forcibly moving the brake shoes into engagement with the periphery of the drum 82 and retarding the rotation of the brake drum 85. Inasmuch as the drum 82 does not rotate, this will have the effect of retarding the rotation of the brake drum 85 and therefore slowing down the descent of the load.

The operation of the several parts of the mechanism has been sufficiently described in connection with the explanation of the details of construction of our improved elevator in the embodiment thereof illustrated in the drawings, and, therefore, further detailed description of such operation is believed to be unnecessary. In conclusion, we wish it to be understood that our invention is not to be restricted to the specific construction shown and described, except as to such features thereof as are particularly claimed, but includes generically the subject matter of the broader claims.

What we claim as our invention, and desire to secure by Letters Patent, is—

1. In a portable elevator, the combination with a wheeled base, an elevator frame mounted thereon and a load-carrying platform guided by said frame, of a hoisting drum mounted on the base and operatively connected with said platform, variable speed mechanism for rotating said drum to lift the platform, and a governor for controlling the descending speed of the platform.

2. In a portable elevator, the combination with a wheeled base, an elevator frame mounted thereon and a load-carrying platform guided by said frame, of a hoisting drum mounted on the base and operatively connected with said platform, variable speed mechanism for rotating said drum to lift the platform, brake mechanism normally holding the platform against descent, and a governor for controlling the descending speed of the platform.

3. In a portable elevator, the combination with a wheeled base, an elevator frame mounted thereon and a load-carrying platform guided by said frame, of a hoisting drum mounted on the base and operatively connected with said platform, variable speed mechanism for rotating said drum to lift the platform, brake mechanism normally holding the platform against descent, and a governor connected with said brake mechanism and operating to control the descending speed of the platform.

4. In a portable elevator, the combination with a wheeled base, an elevator frame mounted thereon and a load-carrying platform guided by said frame, of a hoisting drum mounted on the base and operatively connected with said platform, variable speed mechanism for rotating said drum to lift the platform, a brake drum mounted co-axially with said shaft, ratchet mechanism connecting said brake drum with said shaft, a brake cooperating with said brake drum, and a governor for controlling the descending speed of the platform.

5. In a portable elevator, the combination with a wheeled base, an elevator frame mounted thereon and a load-carrying platform guided by said frame, of a hoisting drum mounted on the base and operatively connected with said platform, variable speed mechanism for rotating said drum to lift the platform, a brake drum mounted co-axially with said shaft, a ratchet wheel mounted on and rotating with said shaft, a pawl carried by said brake drum and engaging said ratchet wheel, a brake cooperating with said brake drum, and a governor connected with said brake drum for controlling the descending speed of the platform.

6. In a portable elevator, the combination with a wheeled base, an elevator frame mounted thereon and a load-carrying platform guided by said frame, of a hoisting drum mounted on the base and operatively connected with said platform, an operating shaft, gearing operatively connecting said shaft with said drum, a brake drum mounted co-axially with said shaft, a ratchet wheel mounted on and rotating with said shaft, a pawl carried by said brake drum and engaging said ratchet wheel, a brake cooperating with said brake drum, a stationary drum, and centrifugally operated means connected with said brake drum and adapted to engage said stationary drum to control the descending speed of the platform.

7. In a portable elevator, the combination with a wheeled base, an elevator frame mounted thereon and a load-carrying platform guided by said frame, of a hoisting drum mounted on the base and operatively connected with said platform, an operating shaft, a sleeve rotatably mounted on said shaft, gearing connecting said sleeve with said hoisting drum, and gearing connecting said shaft with said sleeve.

8. In a portable elevator, the combination with a wheeled base, an elevator frame mounted thereon and a load-carrying platform guided by said frame, of a hoisting drum mounted on the base and operatively connected with said platform, an operating shaft, a sleeve rotatably mounted on said shaft, gearing connecting said sleeve with said hoisting drum, gearing connecting said shaft with said sleeve, and means for normally holding said shaft against reverse rotation.

9. In a portable elevator, the combination with a wheeled base, an elevator frame mounted thereon and a load-carrying platform guided by said frame, of a hoisting drum mounted on the base and operatively connected with said platform, an operating shaft, a sleeve rotatably mounted on said shaft, a stationary support, and a pinion mounted on said support and operatively connecting said sleeve and said shaft.

10. In a portable elevator, the combination with a wheeled base, an elevator frame mounted thereon and a load-carrying platform guided by said frame, of a hoisting drum mounted on the base and operatively connected with said platform, an operating shaft, a sleeve rotatably mounted on said shaft, a stationary support, a pinion rotating with said shaft, a gear rotating with said sleeve, and a pinion mounted on said stationary support and operatively connecting said gear and pinion.

11. In a portable elevator, the combination with a wheeled base, an elevator frame mounted thereon and a load-carrying platform guided by said frame, of a hoisting drum mounted on the base and operatively connected with said platform, an operating shaft, a sleeve rotatably mounted on said shaft, a stationary support, a pinion rotating with said shaft, an internal gear rotating with said sleeve, and a pinion mounted on said stationary support and connecting said gear and pinion.

12. In a portable elevator, the combination with a wheeled base, an elevator frame mounted thereon and a load-carrying platform guided by said frame, of a hoisting drum mounted on the base and operatively connected with said platform, an operating shaft, a sleeve rotatably mounted on said shaft, a stationary drum, a pinion mounted thereon and connecting said sleeve and shaft, and a governor operated by reverse rotation of said shaft and co-acting with said stationary drum.

13. In a portable elevator, the combination with a wheeled base, an elevator frame mounted thereon and a load-carrying platform guided by said frame, of a hoisting drum mounted on the base and operatively connected with said platform, an operating shaft, a sleeve rotatably mounted on said shaft, a stationary drum, a pinion mounted thereon and connecting said sleeve and shaft, a brake drum mounted co-axially with said shaft, ratchet mechanism connecting said brake drum with said shaft, and a centrifugal governor connected with said brake drum and co-acting with said stationary drum for controlling the descending speed of the platform.

14. In a portable elevator, the combination with a wheeled base, an elevator frame mounted thereon and a load-carrying platform guided by said frame, of a hoisting drum mounted on the base and operatively connected with said platform, an operating shaft adapted to receive a crank, a sleeve rotatably mounted on said shaft, one end of said sleeve being adapted to receive a crank, gearing connecting said sleeve with said hoisting drum, and gearing connecting said shaft with said sleeve.

15. In a portable elevator, the combination with a wheeled base, an elevator frame mounted thereon and a load-carrying platform guided by said frame, of a hoisting drum mounted on the base and operatively connected with said platform, an operating shaft adapted to receive a crank, a sleeve rotatably mounted on said shaft, one end of said sleeve being adapted to receive a crank, gearing connecting said sleeve with said hoisting drum, gearing connecting said shaft with said sleeve, and means normally acting to prevent reverse rotation of said shaft and sleeve.

16. In a portable elevator, the combination with a wheeled base, an elevator frame mounted thereon and a load-carrying platform guided by said frame, of a hoisting drum mounted on the base and operatively connected with said platform, an operating shaft, means operatively connecting said shaft with said drum, and means co-axial with said shaft for operating said drum at a different speed.

17. In a portable elevator, the combination with a wheeled base, an elevator frame mounted thereon and a load-carrying platform guided by said frame, of a hoisting drum mounted on the base and operatively connected with said platform, an operating shaft, means operatively connecting said shaft with said drum, means co-axial with said shaft for operating said drum at a different speed, and means normally operating to prevent reverse rotation of said drum.

18. In a portable elevator, the combination with a wheeled base, an elevator frame mounted thereon and a load-carrying platform guided by said frame, of a hoisting drum mounted on the base and operatively connected with said platform, an operating shaft, means operatively connecting said shaft with said drum, means co-axial with said shaft for operating said drum at a different speed, and a governor for controlling the descending speed of the platform.

19. In a portable elevator, the combination with a wheeled base, an elevator frame mounted thereon and a load-carrying platform guided by said frame, of a hoisting drum mounted on the base and operatively connected with said platform, an operating shaft, means operatively connecting said shaft with said drum, means co-axial with said shaft for operating said drum at a different speed, means normally operating to prevent reverse rotation of said drum, and a governor for controlling the descending speed of the platform.

20. In a portable elevator, the combination with a wheeled base, an elevator frame mounted thereon and a load-carrying platform guided by said frame, of a hoisting drum mounted on the base and operatively connected with said platform, an operating shaft, gearing operatively connecting said shaft with said drum, a brake drum holding said shaft against reverse rotation, a normally set brake cooperating with said brake drum, and a lever for releasing said brake, said lever having a crank receiving socket whereby said crank may be employed to operate said lever.

21. In a portable elevator, the combination with a wheeled base, an elevator frame mounted thereon and a load-carrying platform guided by said frame, of a hoisting drum mounted on the base and operatively connected with said platform, an operating shaft, gearing operatively connecting said shaft with said drum, a brake drum for holding said shaft against reverse rotation, a normally set brake cooperating with said brake drum, and a lever for releasing said brake, said lever having an internally tapered sleeve adapted to receive a tapered actuating device.

22. In a portable elevator, the combination with a wheeled base, a folding elevator frame comprising side standards rigidly secured to said base, extension side standards mounted on said fixed side standards, offset hinges connecting said extension standards with said fixed standards, and overlapping plates carried by said extension and fixed standards for holding them in alinement with each other.

23. In a portable elevator, the combination with a wheeled base, an elevator frame mounted thereon and a load-carrying platform guided by said frame, of a hoisting drum mounted on the base and operatively connected with said platform, variable speed mechanism for rotating said drum to lift the platform, a stationary drum, governor mechanism cooperating with said stationary drum, and means operated by the lowering of the platform for actuating said governor mechanism.

ARTHUR M. BARRETT.
FRANK L. EIDMANN.